United States Patent [19]

Huber et al.

[11] Patent Number: 5,065,722
[45] Date of Patent: Nov. 19, 1991

[54] APPARATUS HAVING A CONTROL MOTOR FOR INTERVENTION INTO A FORCE TRANSMISSION DEVICE

[75] Inventors: Werner Huber, Schwaikheim; Guenter Spiegel, Worms, both of Fed. Rep. of Germany

[73] Assignee: Robert Bosch GmbH, Stuttgart, Fed. Rep. of Germany

[21] Appl. No.: 569,050

[22] Filed: Aug. 17, 1990

[30] Foreign Application Priority Data

Oct. 18, 1989 [DE] Fed. Rep. of Germany ....... 3934738

[51] Int. Cl.⁵ .............................................. F02D 7/00
[52] U.S. Cl. .................................. 123/399; 123/396; 123/361; 123/400
[58] Field of Search .................. 123/361, 399, 400; 251/129.03

[56] References Cited

U.S. PATENT DOCUMENTS

| 4,714,864 | 12/1987 | Yogo et al. | 123/361 |
| 4,721,281 | 1/1988 | Kratt et al. | 151/129.03 |
| 4,756,287 | 7/1988 | Sakakibara | 123/361 |
| 4,787,353 | 11/1988 | Ishikawa et al. | 123/399 |
| 4,821,831 | 4/1989 | Onishi | 123/361 |
| 4,848,297 | 7/1989 | Hickmann et al. | 123/361 |
| 4,856,477 | 8/1989 | Hanaoka et al. | 123/361 |
| 4,856,610 | 8/1989 | Leiber et al. | 123/361 |
| 4,865,151 | 9/1989 | Kobayashi et al. | 123/361 |
| 4,919,097 | 4/1990 | Mitui et al. | 123/361 |
| 4,951,772 | 8/1990 | Peter et al. | 123/301 |
| 4,953,529 | 9/1990 | Pfalzgraf et al. | 123/361 |
| 4,960,090 | 10/1990 | Muschalik et al. | 123/361 |
| 4,961,355 | 10/1990 | Irino et al. | 123/399 |
| 4,972,817 | 11/1990 | Wilde et al. | 123/361 |
| 4,972,919 | 11/1990 | Ogawa | 123/361 |

FOREIGN PATENT DOCUMENTS 2186024 8/1987 United Kingdom .
2203798 4/1988 United Kingdom ................ 123/361

*Primary Examiner*—E. Rollins Cross
*Assistant Examiner*—Thomas Moulis
*Attorney, Agent, or Firm*—Edwin E. Greigg; Ronald E. Greigg

[57] ABSTRACT

An apparatus for controlling a control device of a driving engine mechanically, via an operating element. As well as by a control motor in the direction of reduced output of the driving engine, independently of a control position defined by the operating element. The apparatus includes a restoring spring and a repose stop located away from the control device in a final control element. The apparatus is particularly well-suited to motor vehicles equipped with traction control.

22 Claims, 1 Drawing Sheet

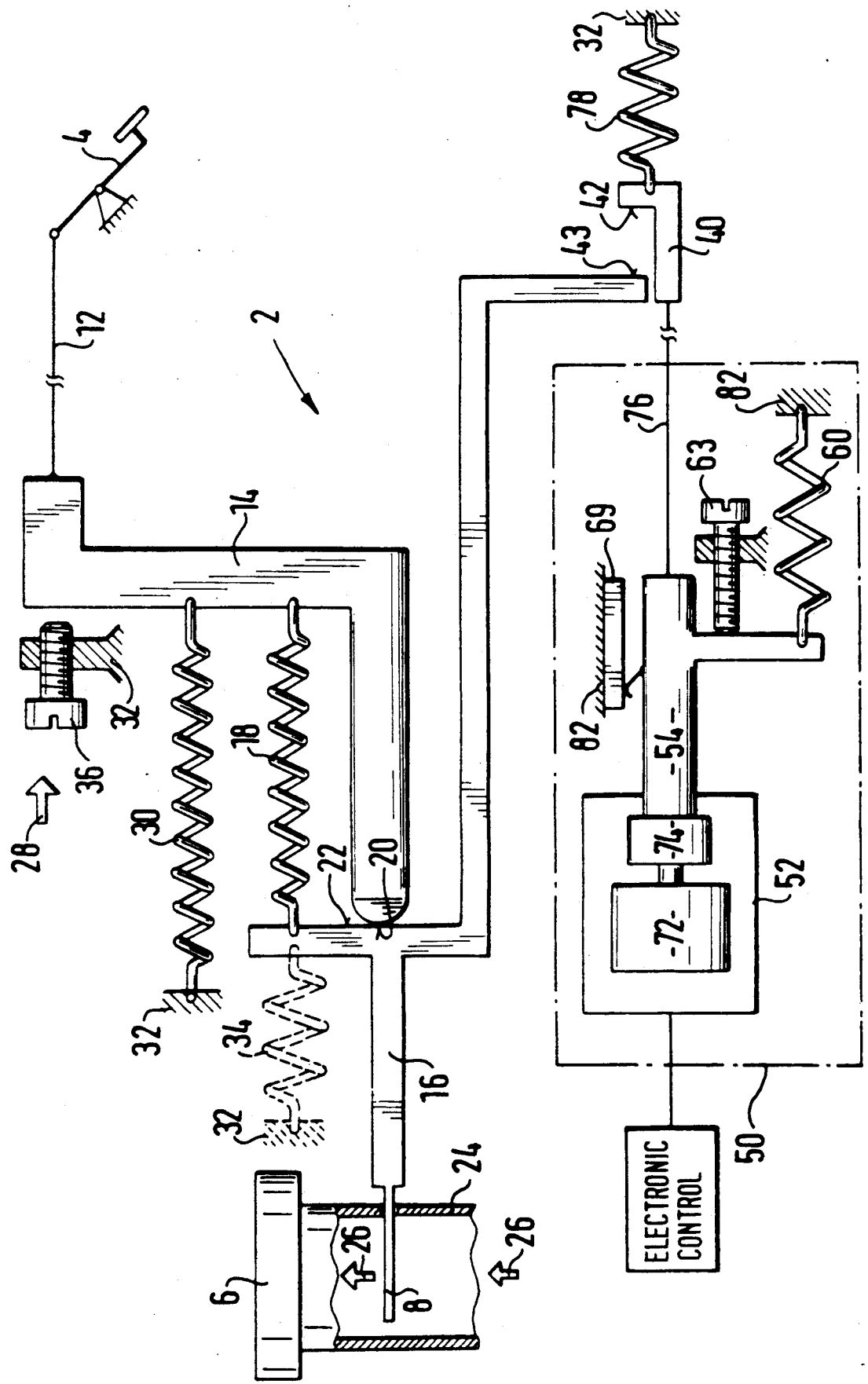

APPARATUS HAVING A CONTROL MOTOR FOR INTERVENTION INTO A FORCE TRANSMISSION DEVICE

RELATED APPLICATIONS

This application relates to subject matter generally similar to other applications filed simultaneously by the same assignee, the applications being identified by German Patent Application Nos. P 39 34 737.0 and P 39 34 739.7, further identified by Serial Nos. 569,051, and 568,813, respectively, and filed in the U.S. Patent and Trademark Office on Aug. 17, 1990.

BACKGROUND OF THE INVENTION

The invention is based on an apparatus having a control motor for intervention into a force transmission device, between an operating element and a control device that determines the output of a driving engine, as defined hereinafter.

For various closed-loop control tasks in driving engines, intervention into the force transmission device between the operating element, such as a gas pedal, and the control device, such as a throttle valve in an Otto engine or a control lever of a Diesel engine or the like, is necessary. One reason for an adjustment may for instance be to avoid slip between wheels of a motor vehicle that are driven by the driving engine and a road surface.

A known apparatus includes a first driver element connected to the operating element, a second driver element connected to the control device, a third driver element via which the control motor can act upon the control device, and a restoring spring that can actuate the third driver element counter to a reposed stop are combined in the region of the control device. If the control device is a throttle valve, then the aforementioned components are located directly on the intake tube of the auto engine. However, very cramped conditions often prevail in the region of the intake tube, so that it is difficult to create sufficient installation space for the known apparatus, or else an optimal disposition for the intake tube cannot be selected.

OBJECTS AND SUMMARY OF THE INVENTION

The apparatus according to the invention has an advantage over the prior art that with it, very favorable and flexible installation conditions are created.

The disposition of an actual-value transducer in the final control element simplifies detection of the control position in an advantageous manner, because the expenditure for control and electrical purposes is reduced.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing shows an exemplary embodiment of the invention in simplified form.

DESCRIPTION OF THE PREFERRED EMBODIMENTS

The structure and operation of an apparatus according to the invention in an engine, in particular in a vehicle, having a control motor for intervention into a force transmission device 2 between an operating element 4 and a control device 8 that determines the output of a driving engine 6, will now be described in further detail in terms of a preferred exemplary embodiment shown in the drawing.

The apparatus according to the invention can be used in any machine containing a driving engine 6, in which closed-loop control of the driving engine 6 is to be effected. The machine may either be mounted in stationary fashion or may for instance be a self-propelled machine or in other words a vehicle. Although not restricted solely to this, it will be assumed in the description of the exemplary embodiment, for the sake of simplicity, that the apparatus according to the invention is to be installed in a vehicle having an Otto engine.

The force transmission device 2 substantially includes a transmission element 12, a first driver element 14, a second driver element 16 and a coupling spring 18.

The first driver element 14 is connected to the operating element 4 by the transmission element 12, and the control device 8 is connected directly to the second driver element 16. The coupling spring 18 acts at one end on the first driver element 14 and at the other on the second driver element 16, in such a way that both driver elements 14, 16 are urged to execute a motion relative to one other until a first coupling stop 20 of the first driver element 14 comes to rest against a second coupling stop 22 of the second driver element 16.

The control device 8 is for instance a throttle valve 8 installed in an intake tube 24. Depending on the control position of the throttle valve 8, a flow, represented symbolically by arrows 26, for instance of a mixture flowing through the intake tube 24 to the driving engine 6 can be varied. In this way, the output of the driving engine 6 is controlled via the control position of the throttle valve 8. Actuation of the throttle valve 8 in the direction of an arrow 28 shown in the drawing represents an increase in the output of the driving engine 6, and actuation of the throttle valve 8 counter to the direction of the arrow 28 represents a reduction in the output of the driving engine 6. By means of the operating element 4, the control device 8 can be actuated via the force transmission device 2 in the direction of the arrow 28. The control device 8 can be actuated counter to the direction of the arrow 28 by a restoring spring 30 provided on the force transmission device 2. The restoring spring 30 acts at one end on a wall 32 and on the other on the first driver element 14. The restoring spring 30 acts on the first driver element 14 counter to the direction of the arrow 28. In addition to or instead of the restoring spring 30, some other restoring spring 34, shown in dashed lines, may also be provided. The restoring spring 34 likewise acts on one end on the wall 32, and on the other it acts on the second driver element 16 counter to the direction of the arrow 28. Depending on the actuation of the operating element 4, the two restoring springs 30, 34 can actuate the driver elements 14, 16 and the throttle valve 8 counter to the direction of the arrow 28, until one of these latter elements comes to rest on an adjustable idling stop 36. In the exemplary embodiment, the first driver element 14 can be made to contact the idling stop 36.

The force of the coupling spring 18 is dimensioned such that without influence by a third control element 40 on the force transmission device 2, the first coupling stop 20 of the first driver element 14 rests constantly on the second coupling stop 22 of the second driver element 16, and a control position of the operating element 4 can be transmitted to the control device 8 via the force transmission device 2.

Additionally, there is also the third driver element 40. The third driver element 40 has a stop 42, and the second driver element 16 on the other hand has a stop 43 on one end thereof. Upon actuation of the third driver element 40 counter to the direction of the arrow 28, the stop 42 of the third driver element 40 can come to rest on the stop 43 of the second driver element 16. If the third driver element 40 is actuated beyond this counter to the direction of the arrow 28, then the second driver element 16 is likewise carried along counter to the direction of the arrow 28. The third driver element 40 can be actuated by a final control element 50.

The final control element 50 substantially includes a control motor 52 having an operative member 54, a restoring spring 60, a repose stop 63, and optionally an actual-value transducer 69. The control motor 52 may be a rotary motor, for example, and the operative member 54 a rotor shaft; alternatively, as shown, the control motor 52 is a linear motor, such a hydraulic cylinder, and the operative member 54 in this case is a piston rod. The operative member 54 may be the shaft of the control motor directly, for example, or a gear 74 can be interposed between the operative member 54 and an actual motor 72 of the control motor 52. In this latter case, the operative member 54 is an output shaft of the gear 74. The operative member 54 is connected to the third driver element 40 by a transmission means 76. The transmission means 76 may be a rod assembly, a Bowden cable, a sheathed cable, or the like. If the transmission means 76 is a Bowden cable or a sheathed cable, for instance, then a tension spring 78 provided between the third driver element 40 and the wall 32 and acting upon the third driver element 40 in the direction of the arrow 28 assures a minimum tension in the transmission means 76; that is, the tension spring 78 prevents sagging of the sheathed cable, for instance. The tension spring 78 may be relatively small and weak, because it need merely compensate substantially for frictional forces acting upon the third driver element 40 and upon the transmission means 76. The tension spring 78 may also be dispensed with, depending on the embodiment of the transmission means 76, for instance if the latter is a rod assembly.

The restoring spring 60 acts at one end on a housing 82 of the final control element 50 and at the other on the operative member 54, in the direction of the arrow 28, with the tendency of actuating the operative member 54 of the control motor 52 counter to the repose stop 63. Depending on the application of the apparatus according to the invention, this function can also be dispensed with. In that case the restoring spring 60 may be omitted as well.

With the aid of the actual-value transducer 69 secured to the housing 82, a control position of the operative member 54 of the final control element 50 can be detected. Since upon triggering of the control motor 52 the stops 42, 43 of the third driver element 40 and of the second driver element 16 come to rest upon one other, when the control motor 52 is in the actuated state a control position of the second driver element 16 can be detected, at least indirectly, by the actual-value transducer 69, and hence that of the control device 8 is detectable as well. In the region of the control device 8, an actual-value transducer is already often provided for detecting a control position of the control device 8, for instance in order to regulate gasoline metering, but for electrical reasons it is poorly suited to detecting the control position of the control device 8 for the sake of triggering the control motor 52. Since cramped installation conditions often prevail in the region of the control device 8, it is particularly favorable to dispose the actual-value transducer 69 in the region of the final control element 50. For safety reasons, for instance, it may also be favorable to provide two or more actual-value transducers 69.

In the apparatus according to the invention, a distinction can be made between two operating states. The first operating state is the unregulated operating state. In this state, the control motor 52 of the final control element 50 is not triggered. In the first operating state, the control device 8 can be moved into any desired control position by the operating element 4 without influence by the final control element 50. The operative member 54 of the control motor 52 in the first operating state rests on the repose stop 63. Because of the transmission means 76 and because of the optionally present tension spring 58, the third driver element 40 is located in a position of repose; that is, the third driver element 40 is actuated as far as possible in the direction of the arrow 28. Because of a spacing between the two stops 42, 43 of the third driver element 40 and second driver element 16, the stop 42 of the third driver element does not come to rest on the stop 43 of the second driver element 16 in the first operating state.

Upon actuation of the control device 8 by the operating element 4 in the direction of the arrow 28, the output produced by the driving engine 6 is increased. In this process it may happen that sensors, not shown, detect slip between driven wheels, not shown, and some road surface. The slip is highly undesirable. To avoid slip, the control motor 52 of the final control element 50 is triggered via electronics, not shown. In that case, the apparatus according to the invention operates in its second operating state, which can accordingly be called the regulated operating state. In the second operating state, the operative member 54 of the control motor 52 actuates the third driver element 40 counter to the arrow 28, and the stop 42 of the third driver element 40 can come to rest on the stop 43 of the second drive element 16. If the third driver element 40 is actuated beyond this point counter to the direction of the arrow 28 by the operative member 54 of the final control element 50, then the second driver element 16 and thus the control device 8 are also actuated counter to the direction of the arrow 28, or in other words in the direction of a reduced output of the driving engine 6. The control device 8 is actuated far enough counter to the direction of the arrow 28 that the sensors (not shown) do not detect inadmissibly high slip between the driven wheels and the road surface.

Depending on the embodiment, the transmission means 76 may be located very flexibly. The fact that the restoring spring 60 and the repose stop 63 and the actual-value transducer 69 can all be disposed spatially independently of the intake tube 24 advantageously makes installation of the intake tube 24 and control device 8 considerably simpler. It is furthermore particularly advantageous to combine the restoring spring 60 and/or the repose stop 63 with the control motor 52 in the final control element 50. The final control element 50 is preferably a compact unit, which can be disposed if needed with variable spacing with respect to the intake tube 24. The connection between the final control element 50 and the third driver element 40, and thus, depending on the triggering of the control motor 52, the connection with the force transmission device 2 is effected by the transmission means 76.

Compared with the restoring spring 34, the restoring spring 30 has an advantage that the coupling spring 18 can be made weaker. Moreover, in the second operating state, the influence of the final control element 50 on the operating element 4 is weaker, and the force to be brought to bear by the final control element 50 in the second operating state is less.

The apparatus according to the invention has been described in terms of an exemplary embodiment having linear directions of motion parallel to the arrow 28. In another exemplary embodiment of the same apparatus according to the invention, at least some individual components do not move linearly but instead are pivotably supported. A motion in the direction of the arrow 28 then represents rotation in one direction, and a motion counter to the direction of the arrow 28 represents rotation in the opposite direction. Since the control device 8 is typically rotatably supported, it is a logical option to support the other components rotatably as well.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus having a control motor (52) for intervention into a force transmission device (2) between an operating element (4) and a control device (8) that determines an output of a driving engine (6), the operating element (4) is operatively connected to a first drive element (14) and the control device is operatively connected to a second drive element (16), a coupling spring (18) is connected on one end to the first driver element (14) and on the other end is connected to the second driver element (16) such that the driver elements are urged to execute a motion relative to one another until a first coupling stop (20) or said first driver element comes to rest on a second coupling stop (22) of said second driver element, an operative member (54) connected to said control motor (52) a transmission means (76) connected to said operative member 54 and to a third drive element (40) which upon a control motor intervention acts upon the second driver element (16) in a direction of reducing an output of the driving engine, a first restoring spring (60) connected at one end to said operating member 54 and at its opposite end to a housing part (82) said operating member (54) of the control motor (52), when intervention is not occurring, is actuated by said first restoring spring (60) counter to a direction of reduction of an output of the driving engine toward a repose stop (63), wherein the control motor (52) along with the operative member (54), the first restoring spring (60) and the repose stop (63) form a final control element (50) disposed spaced apart from the control device (8).

2. An apparatus as defined by claim 1, in which said second driver element (16) is firmly connected to the control device (8).

3. An apparatus as defined by claim 1, in which a second restoring spring (30) acts upon the first driver element (14) in a direction of a reduction in output of the driving engine (6).

4. An apparatus as defined by claim 2, in which a second restoring spring (30) acts upon the first driver element (14) in a direction of a reduction in output of the driving engine (6).

5. An apparatus as defined by claim 1, in which a third restoring spring (34) acts upon the second driver element (16) in a direction of a reduction in output of the driving engine (6).

6. An apparatus as defined by claim 2, in which a third restoring spring (34) acts upon the second driver element (16) in a direction of a reduction in output of the driving engine (6).

7. An apparatus as defined by claim 3, in which a third restoring spring (34) acts upon the second driver element (16) in a direction of a reduction in output of the driving engine (6).

8. An apparatus as defined by claim 4, in which a third restoring spring (34) acts upon the second driver element (16) in a direction of a reduction in output of the driving engine (6).

9. An apparatus as defined by claim 1, in which a tension spring (78) actuates the transmission means (76) counter to the intervention direction of the control motor (52).

10. An apparatus as defined by claim 2, in which a tension spring (78) actuates the transmission means (76) counter to the intervention direction of the control motor (52).

11. An apparatus as defined by claim 3, in which a tension spring (78) actuates the transmission means (76) counter to the intervention direction of the control motor (52).

12. An apparatus as defined by claim 4, in which a tension spring (78) actuates the transmission means (76) counter to the intervention direction of the control motor (52).

13. An apparatus as defined by claim 5, in which a tension spring (78) actuates the transmission means (76) counter to the intervention direction of the control motor (52).

14. An apparatus as defined by claim 6, in which a tension spring (78) actuates the transmission means (76) counter to the intervention direction of the control motor (52).

15. An apparatus as defined by claim 7, in which a tension spring (78) actuates the transmission means (76) counter to the intervention direction of the control motor (52).

16. An apparatus as defined by claim 8, in which a tension spring (78) actuates the transmission means (76) counter to the intervention direction of the control motor (52).

17. An apparatus as defined by claim 1, in which said final control element (50) includes at least one actual-value transducer (69), with which a control position of the operative member (54) can be detected.

18. An apparatus as defined by claim 2, in which said final control element (50) includes at least one actual-value transducer (69), with which a control position of the operative member (54) can be detected.

19. An apparatus as defined by claim 3, in which said final control element (50) includes at least one actual-value transducer (69), with which a control position of the operative member (54) can be detected.

20. An apparatus as defined by claim 5, in which said final control element (50) includes at least one actual-value transducer (69), with which a control position of the operative member (54) can be detected.

21. An apparatus as defined by claim 8, in which said final control element (50) includes at least one actual-value transducer (69), with which a control position of the operative member (54) can be detected.

22. An apparatus as defined by claim 9, in which said final control element (50) includes at least one actual-value transducer (69), with which a control position of the operative member (54) can be detected.

* * * * *